UNITED STATES PATENT OFFICE.

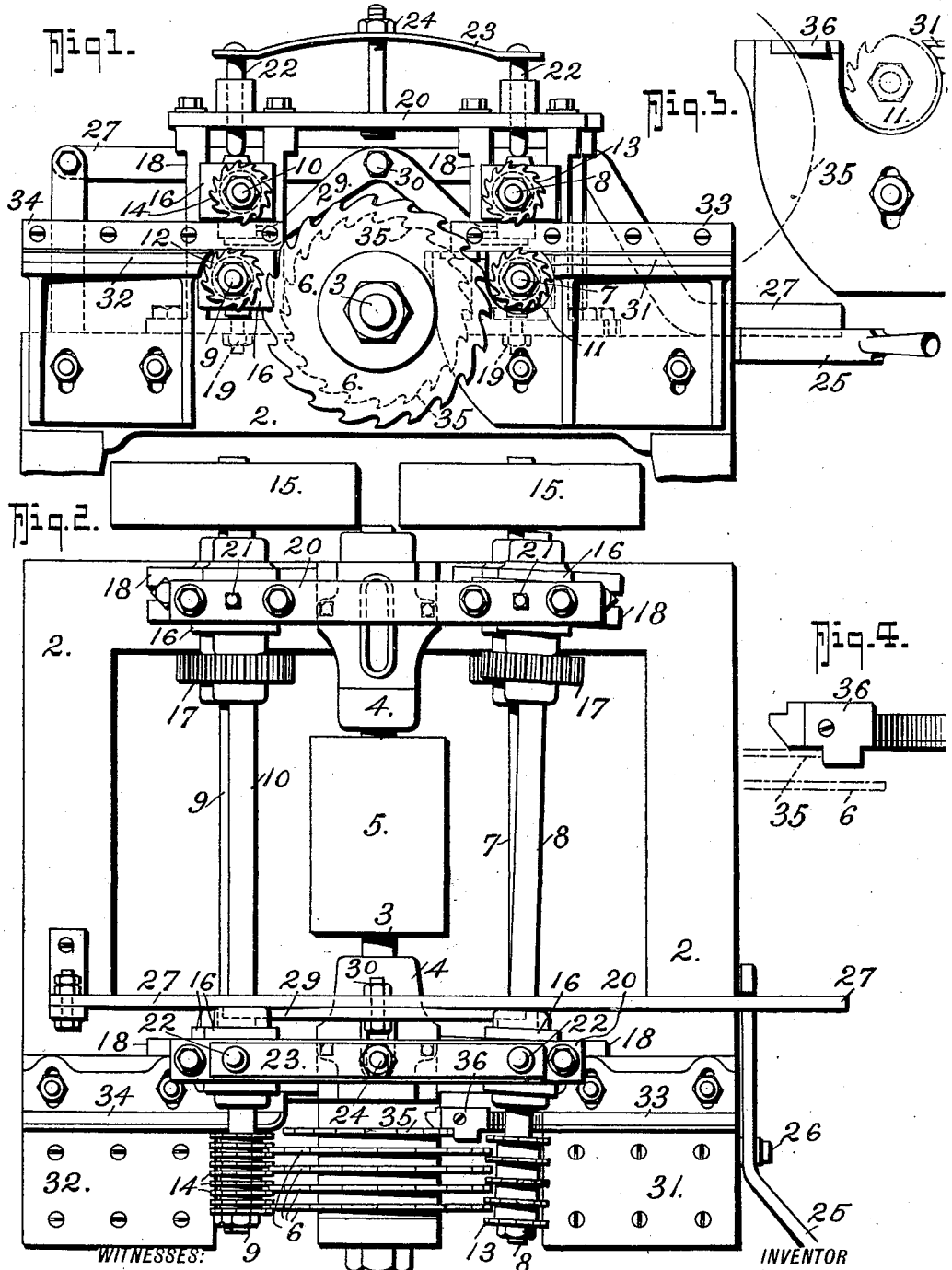

MAHLON L. PETERMAN, OF MILLSIDE, BRITISH COLUMBIA, CANADA.

LATH-STRIPPER.

1,007,308.  Specification of Letters Patent.  Patented Oct. 31, 1911.

Application filed February 10, 1910. Serial No. 543,159.

*To all whom it may concern:*

Be it known that I, MAHLON L. PETERMAN, a citizen of the United States of America, residing at Millside, in the Province of British Columbia, Canada, have invented a new and useful Lath-Stripper, of which the following is a specification.

This invention relates to what is known in the trade as a "lath stripper", that is, a machine for sawing a lath bolt simultaneously into a series of laths of the required thickness. The lath bolts are previously cut to the desired length and width, and on this machine are divided into laths of the thickness required.

The general principle of the machine, in the provision of a gang of circular saws spaced the required distance apart on an overhanging saw arbor, through which saws the lath bolt is fed, differs nothing from what is known to be in common use; but there are several novel features in the provision of a feeding means that will hold the lath bolt against the fence, in the provision of a facing saw adjacent to the plane of the fence which saw is of smaller diameter than the splitting saws, and in a supporting means to sustain the front end of the bolt when it first meets the downward cut of the saws. These novel features will be specifically drawn attention to in the following specification which fully describes the invention, reference being made to the drawings by which it is accompanied, in which:

Figure 1 is a front elevation of the machine, Fig. 2, a plan of the same, Figs. 3 and 4, an enlarged detail in plan and elevation of the bolt support at the entering side of the saws, and Fig. 5, an enlarged detail of the bearing box for the feed roll shafts showing the eccentric bore by which the inclination of the shaft to the saw arbor is simply attained.

In these drawings 2 represents the main frame of the machine which is supported at a convenient height from the floor for the attendants. Rotatable in bearings 4 in this frame is the saw arbor 3 which is driven by a belt over a pulley 5 situated midway between the bearings which thus amply support the arbor in its required overhang. The overhanging end of the arbor toward the front of the machine is furnished with a gang of circular saws 6 having distance pieces between them to hold them the required distance apart to cut laths of the desired thickness.

The lath bolts are fed to the upper side of the saws from a bracketed table 31 at the entering side and the divided laths are delivered on to a similar table 32 at the leaving side, which bracketed tables are vertically adjustable in their attachment to the main frame 2 of machine. Secured on the upper side of these bracketed tables 31 and 32 adjacent to the plane of the facing saw 35, are fences 33 and 34, the wearing surfaces of both tables and fences being faced with saw steel to resist wear.

Between the nearer edge of each bracket table 31 and 32 and the saws 6 are the bottom feed and delivery rolls 11 and 12, each secured on the overhanging end of shafts 7 and 9 rotatable in bearing boxes 16 in pedestals 18 secured to the frame 2 of the machine. These shafts 7 and 9 are driven by a belt over pulleys 15 secured to them at the back of the machine.

The shafts 7 and 9 drive by means of gear wheels 17 the shafts 8 and 10 of the upper feed rolls 13 and 14. The feed rolls are preferably constructed of a series of small diameter circular saws with distance pieces between as they afford a more secure hold of the bolt with a less requirement of pressure. The rolls at the delivery side of the machine have their saws closer pitched as they have to secure a hold of each cut lath.

The bearing boxes 16 of the feed roll shafts are vertically movable in pedestals 18 secured to the main frame 2 the position of the lower boxes being adjusted by set screws 19 threaded through the bottom of the pedestals. Across the upper ends of the pedestals 18 are cover plates 20 and the top bearing boxes 16 are at the back held down by set screws 21 threaded through the cover plates and at the front end by pins 22 slidable through the cover plates on the upper ends of which pins bear the ends of a spring 23 secured at 24 to the center of the cover plate. With this provision the upper feed rolls may yield to suit the varying thicknesses of bolt and they may be lifted when required against the springs by the attendant, by means of a handle lever 25 pivoted at 26 and bearing under the free end of a lever 27 extending across the machine, from the middle of which lever a bearer 29 is pivotally mounted at 30 the ends of which bearer extend under the bearing boxes and lift them up when the handle lever 25 is depressed.

The shaft 8 of the entering feed rolls 11 and 13 are angled in relation to the axis of the saw arbor the object of which is to press the entering lath bolt tightly against the fences 33 and 34. This feature is an important and novel feature of my device.

The inner saw 35, which is used to face the side of the bolt which is toward the fence is made of smaller diameter than the other saws 6 and a support 36 of tool steel is secured in the upper edge of the vertical member of the bracket 31 in a position where it will support the front end of the lath bolt against the downward force of the cut. This support is shown in detail in Figs. 3 and 4 and is a second important feature in the design of the machine.

The upper feed rolls 13 and 14 are set nearer to a vertical plane through the axis of the saw arbor than the lower ones the object of which is to more effectually hold the lath bolt down on their supports. This feature is simply attained by having the bore of the bearing boxes 16 slightly out of the center of the width, as shown in Fig. 4, so that the same box reversed may be used for the top and bottom roller shaft bearings.

So constructed the machine is a particularly efficient one for the purpose intended. The bolts are entered from the bracket table 31 and are passed between the feed rollers 11 and 13. They are immediately strongly fed against the fences 33 by the inclination of the feed rolls toward it. As soon as the bolt enters the cut of the saws it is supported by the inserted projections 36 and the inner side of the bolt is faced by the saw 35. The bolt is divided into separate laths of the required thickness which as they pass the saws are first secured by the top roller 14 which is nearer the saws and later by the lower one 12 between which rollers the cut laths are passed on to the table bracket 32 and delivered from the machine for bundling.

Having now particularly described my invention and the manner of its operation, I hereby declare that what I claim as new and desire to be protected in by Letters Patent, is:

In a lath stripper, a main frame, a saw carrying arbor mounted in bearings in said main frame and having a projecting end, a gang of saws on said arbor, table brackets secured to the frame of the machine on each side of said saws and spaced from said saws, feed rolls mounted in the spaces between said brackets and said saws, one of said brackets having a portion projecting in back of said saws and cut-away to receive the corresponding feed roll, the inner saw of said gang being of lesser diameter than the remaining saws, and a support removably secured to the upper edge of the projecting portion of said brackets projecting beyond said inner saw and terminating adjacent to the next succeeding saw.

In testimony whereof I have signed my name to this specification in the presence of two subscribing witnesses.

MAHLON L. PETERMAN.

Witnesses:
MARY PETERMAN,
ALEXANDER SMITH.

---

Copies of this patent may be obtained for five cents each, by addressing the "Commissioner of Patents, Washington, D. C."